(12) United States Patent
Quinn et al.

(10) Patent No.: US 6,748,147 B2
(45) Date of Patent: Jun. 8, 2004

(54) HIGH STRENGTH FIBER OPTIC CABLE (75) Inventors: Chris M. Quinn, Hickory, NC (US); Donald R. Parris, Newtown, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/822,529

(22) Filed: Mar. 30, 2001

(65) Prior Publication Data

US 2004/0057681 A1 Mar. 25, 2004

(51) Int. Cl.[7] .................................................. G02B 6/44
(52) U.S. Cl. ..................................................... 385/110
(58) Field of Search ................................. 385/110, 112, 385/113, 100, 105, 106, 109, 111

(56) References Cited

U.S. PATENT DOCUMENTS

| | | | |
|---|---|---|---|
| 3,865,466 A | 2/1975 | Slaughter | 350/96 |
| 4,093,342 A | 6/1978 | Foord et al. | 350/96.23 |
| 4,166,670 A | 9/1979 | Ramsay | 350/96.23 |
| 4,354,732 A | 10/1982 | Arnaud et al. | 350/96.23 |
| 4,360,395 A | 11/1982 | Suzuki | 156/54 |
| 4,422,889 A | 12/1983 | Trezeguet et al. | 156/70 |
| 4,491,387 A | 1/1985 | Dey et al. | 385/113 |
| 4,504,112 A | 3/1985 | Gould et al. | 350/96.23 |
| 4,557,559 A | 12/1985 | Winter | 350/96.23 |
| 4,577,925 A | 3/1986 | Winter et al. | 350/96.23 |
| 4,647,151 A | 3/1987 | Grogl et al. | 350/96.23 |
| 4,671,610 A | 6/1987 | Kitayama et al. | 385/105 |
| 4,685,765 A | 8/1987 | Daly et al. | 350/96.21 |
| 4,699,461 A | 10/1987 | Taylor et al. | 385/110 |
| 4,775,213 A | 10/1988 | Kitayama et al. | 385/110 |
| 4,786,138 A | 11/1988 | Buckley | 350/96.23 |
| 4,793,686 A | 12/1988 | Saito | 385/110 |
| 4,822,133 A | 4/1989 | Peacock | 350/96.23 |
| 4,830,459 A | 5/1989 | Chicken et al. | 350/96.23 |
| 4,878,733 A | 11/1989 | Winter et al. | 350/96.23 |
| 4,984,869 A | 1/1991 | Roche | 350/96.23 |
| 5,050,960 A | 9/1991 | Sutehall | 385/113 |
| 5,067,830 A | 11/1991 | McAlpine et al. | 385/114 |
| 5,082,380 A | 1/1992 | Sutehall et al. | 385/114 |
| 5,115,485 A | 5/1992 | Gandy | 385/101 |
| 5,222,177 A | 6/1993 | Chu et al. | 385/105 |
| 5,367,971 A | * 11/1994 | Carpenter et al. | 114/243 |
| 5,495,546 A | 2/1996 | Bottoms, Jr. et al. | 385/100 |
| 5,982,966 A | 11/1999 | Bonicel | 385/100 |
| 5,991,485 A | 11/1999 | Kertscher et al. | 385/100 |
| 6,169,834 B1 | 1/2001 | Keller | 385/101 |
| 6,185,351 B1 * | 2/2001 | Daneshvar et al. | 385/114 |

OTHER PUBLICATIONS

Optical Transmission Element, Publication No. WO99/53353, Publication Date Oct. 21, 1999.

* cited by examiner

*Primary Examiner*—Tulsidas Patel
(74) *Attorney, Agent, or Firm*—Michael E. Carroll, Jr.

(57) ABSTRACT

A fiber optic cable having at least one optical fiber component disposed within at least one retention area of a support member. The support member includes metallic or dielectric materials having the retention area generally longitudinally formed therein relative to an axis of the cable. The cable can include a cable jacket substantially surrounding the support member. Additionally, the cable can include a cushioning zone adjacent the optical fiber component, a water-blocking component and/or an interfacial layer at least partially disposed between an outer surface of the support member and the cable jacket. The support member can have at least one bendable tab for at least partially covering the retention area.

36 Claims, 5 Drawing Sheets

HIGH STRENGTH FIBER OPTIC CABLE

FIELD OF THE INVENTION

The present invention relates generally to fiber optic cables and, more particularly, to fiber optic drop cables.

BACKGROUND OF THE INVENTION

Fiber optic cables include optical fibers that are capable of transmitting voice, video, and data signals. Fiber optic cables have advantages over electrical voice, video and data signal carriers, for example, increased data capacity. As businesses and households demand increased data capacity, fiber optic cables can eventually displace electrical voice, video, and data signal carriers. This demand will require low fiber count optical cables to be routed to end users, for example, businesses and households.

Fiber optic cables can typically be used in various applications. For example, fiber optic drop cables may be suitable for both aerial and buried cable applications. More specifically, a fiber optic drop cable may be strung between poles and/or buried in the ground before reaching the end user. Aerial and buried cable environments have unique requirements and considerations. Optical fiber drop cables can meet the unique requirements and considerations of both environments, yet still remain cost effective.

In addition to being cost effective, cables should be simple to manufacture. An example of a low fiber count optical cable manufactured in one step and having optical fibers disposed longitudinally to the cable axis is disclosed in U.S. Pat. No. 5,115,485. An optical fiber is disposed within an electrically conductive strength member that is surrounded and embedded in an elastomeric material that forms the outer jacket. The cable also includes optical fibers embedded in the elastomeric material that forms the outer jacket. This known fiber optic cable has several disadvantages. For example, because the optical fiber is surrounded by the electrically conductive strength member, it is difficult to access the fiber. Moreover, accessing the central optical fiber may result in damage to the embedded optical fibers. Additionally, the embedded optical fibers are coupled to the elastomeric material that forms the outer jacket. Consequently, when the elastomeric outer jacket is stressed, for example, during bending, tensile and compressive stresses can be transferred to the optical fibers, thereby degrading optical performance.

Moreover, fiber optic cables that are strung between poles can carry a tensile load. An example of a fiber optic cable designed to carry a tensile load is disclosed in U.S. Pat. No. 4,422,889. This known cable is an optical fiber cable with a generally cylindrical central support member having helical grooves for carrying optical fibers. During manufacture, the grooves require partial filling with a viscous filling compound, placing the optical fiber in the partially filled groove, and topping off the partially filled groove with further viscous filling compound. Although this known fiber optic cable is designed to prevent the application of tensile stress to the optical fibers by allowing the fibers to sink deeper into the grooves when axially loaded, this design has several disadvantages. For example, from a manufacturing standpoint, it can be more difficult and expensive to form helical grooves and place the optical fibers in helical grooves.

Optical fiber cables are also used in military applications, for example, guidance systems for missiles. An example of a fiber optic cable designed for military applications is disclosed in U.S. Pat. No. 4,786,138. This known cable is designed to be reliable, rugged and difficult to detect, however to achieve these characteristics the cable requires an expensive metal-free material.

Aerial optical fiber sables can also be installed adjacent to installed power transmission systems, an example is disclosed in U.S. Pat. No. 4,786,138. This known cable requires an all-dielectric design for use near power lines. The core includes a slot that houses the optical fibers and a filling compound. The slot requires sealing with a closure cap. A binder is helically wrapped around the core and cap assembly to hold the cap in place. The core and cap assembly is then enclosed with an extruded sheath. This known fiber optic cable has several disadvantages. For example, the cable has multiple components that require multiple manufacturing and assembly steps, which in turn increases cable costs.

ASPECTS OF THE INVENTION

One aspect of the present invention provides a fiber optic cable having at least one optical fiber component disposed within at least one retention area of a support member. The support member includes a metallic material having the retention area generally longitudinally formed therein relative to an axis of the cable. The cable can include a cable jacket, cushioning zone adjacent the optical fiber component, a water-blocking component, an interfacial layer at least partially disposed between an outer surface of the support member and cable jacket and/or at least one tab, extending from the support member, bendable for at least partially covering the retention area.

A second aspect of the present invention provides a fiber optic cable having at least one optical fiber component disposed within at least one retention area of a support member. Disposed adjacent the optical fiber component is a cushioning zone to decouple the optical fiber component from the support member. The support member is formed of a metallic material having the retention area disposed substantially parallel and in about a generally fixed position relative to the longitudinal axis of the cable. A water-blocking component is partially disposed within the retention area. An interfacial layer at least partially disposed between an outer surface of the support member and a cable jacket. The cable jacket substantially surrounds the support member and provides protection. The support member can also have at least one bendable tab for at least partially covering the retention area.

A third aspect of the present invention provides a fiber optic cable having at least one optical fiber component disposed within at least one retention area of a support member. The support member can include a metallic or dielectric material. The support member includes a body and at least one tab, extending from the support member and bendable relative to the body. The at least one tab is bendable to at least partially cover the at least one retention area. The cable can include a cushioning zone, a water-blocking component, interfacial layer and/or a cable jacket.

A fourth aspect of the present invention provides a fiber optic cable having at least one optical fiber component disposed within at least one retention area of a support member. The support member includes a metallic material having the retention area generally longitudinally formed therein relative to an axis of the cable. The cable having a strain of 1.0% or less when a 1,000 lb. tensile force is applied. The cable can include a cable jacket, cushioning zone adjacent the optical fiber component, a water-blocking component, interfacial layer and/or at least one tab, extending from the support member, bendable for at least partially covering the retention area.

DETAILED DESCRIPTION OF THE INVENTIONS

Figures 1, 2:
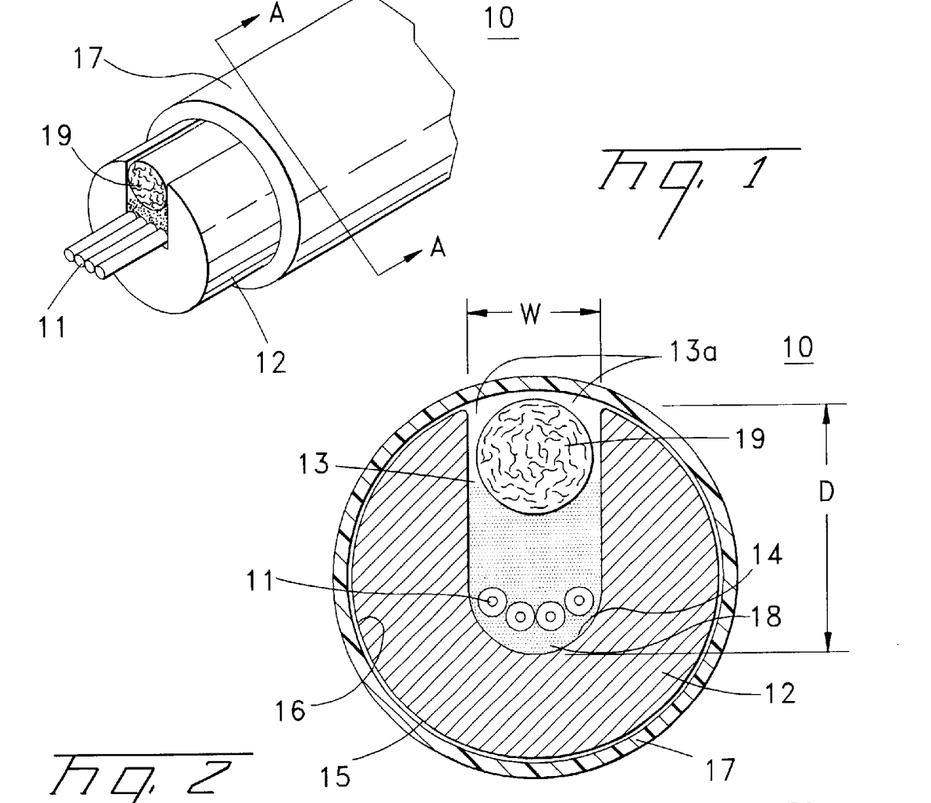
FIG. 1 is an isometric view of a fiber optic cable in accordance with an embodiment of the present invention.
FIG. 2 is a cross sectional view of the embodiment of FIG. 1 taken along line A—A.

A fiber optic cable 10 according to an embodiment of the present invention is depicted in FIGS. 1 and 2. Fiber optic cable 10 includes at least one optical fiber component 11 disposed within a retention area 13 of a support member 12. A cable jacket 17 substantially surrounds optical fiber component 11 and support member 12. A cushioning zone 18 may be disposed adjacent to the optical fiber component, and a water-blocking component 19 may be enclosed by the cable jacket 17.

Optical fiber component 11 preferably comprises four unbundled, loose optical fibers, but component 11 is at least one optical fiber that can be tight buffered. Component 11 may be loose or tight buffered optical fibers, bundled or ribbonized optical fibers in a common matrix, a stack of optical fiber ribbons in a common matrix or any combination thereof. Each optical fiber preferably includes a silica-based core that is operative to transmit light and is surrounded by a silica-based cladding having a lower index of refraction than the core. A soft primary coating surrounds the cladding, and a relatively rigid secondary coating surrounds the primary coating. Each optical fiber can be, for example, a single-mode or multi-mode optical fiber available commercially from Corning Inc.

Cushioning zone 18 preferably preserves optical performance within desirable ranges. Cushioning zone 18 is preferably operable to decouple optical fiber component 11 from support member 12. Preferably, cushioning zone 18 is generally interposed between support member 12 and optical fiber component 11, and it advantageously decouples optical fiber component 11 from support member 12. Most preferably, cushioning zone 18 substantially surrounds optical fiber component 11. The preferred cushioning zone 18 includes yarn, but may include materials such as aramid fibers, greases, gels, foams, thermoplastic filling compounds, water-blocking compounds such as tapes, yarns and/or powders or any other suitable materials.

The preferred embodiment also includes an interfacial layer 15 at least partially disposed between an outer surface 16 of support member 12 and cable jacket 17. Preferably, interfacial layer 15 includes a coating having corrosion protection, most preferably, aluminum. Interfacial layer 15 can include a water-swellable material, a material to promote adhesion between the support member 12 and cable jacket 17 such as ethylene acrylic acetate, a primer, plastic, tape, zinc, copper, other corrosion protective materials and/ or a surface roughness for adhesion purposes.

Figure 13:
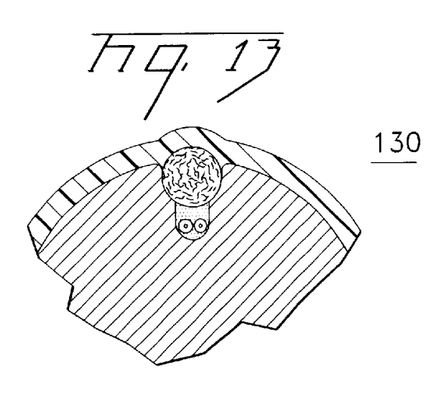
FIG. 13 is a partial cross-sectional view of a fiber optic cable in accordance with an embodiment of the present invention.

In addition, the preferred embodiment includes at least one water-blocking component 19 at least partially disposed in retention area 13 of support member 12. Water-blocking component 19 generally includes water-swellable particles that swell upon exposure to water so as to form a blockage in the cable that inhibits the further migration of water in the cable. Generally, the water-swellable particles are formed of a superabsorbent polymer on a medium, for example, a yarn or tape, but they may be in powder form. Preferred superabsorbent polymers are partially cross-linked polymers that absorb many times their own weight in water and swell considerably without dissolving, for example, acrylate, urethane or cellulosic based materials. Water-blocking component 19 may also serve other functions, for example, the water-blocking component may also function as a ripcord for convenient fiber access. Component 19 can also function as indicia of fiber location by slightly protruding from the profile of the cable jacket (FIG. 13).

Cable jacket 17 generally provides environmental protection and generally surrounds optical fiber component 11 and support member 12. Cable jacket 17 can also be in communication with retention area 13. Cable jacket 17 is preferably formed of polyethylene or flame-retardant plastics, such as PVC or flame retardant polyethylene. A tube on or pressure extrusion process may be used to apply cable jacket 17. The cable jacket generally has a thickness of about one millimeter and a shape that generally conforms to the shape of support member 12, but cable jacket 17 can be used to fill areas and/or alter the cross-sectional shape of cable 10. Furthermore, crush resistance can be incorporated by pressure extruding cable jacket 17 into interstices 13a of retention area 13.

Support member 12 is most, preferably formed of a high strength material, e.g., steel, but it may be manufactured from any suitable high strength dielectric or metallic material. Such materials include, for example, aluminum, copper, composite metals, plastics, or glass-reinforced plastics. In preferred embodiments, cables according to the present invention are mechanically robust, for example, support member 12 is a high strength material that preferably can withstand a predetermined tensile load, up to about 1000 lbs. or more. Additionally, cable 10 preferably has a minimum bend radius of about ten centimeters or less and a maximum span of preferably about two-hundred feet or more. Moreover, at the predetermined tensile load support member 12 and/or cable 10 should have a strain in the range of essentially about 0% to about 1.0%, more preferably between essentially about 0% and about 0.3% and most preferably between essentially about 0% and about 0.1%. Additionally, cable 10 can have an excess fiber length to generally accommodate the range of strains. Excess fiber length in cable 10 can be accomplished, for example, by placing the optical fiber component into a stressed support member during the manufacturing process.

Retention area 13 comprises an optical component receiving area. Preferably, retention area 13 is a groove that can be various shapes, for example, arcuate, U or V grooves, square, any combination thereof or any other suitable shape. In general, retention area 13 is generally longitudinally disposed substantially parallel to the cable axis. Preferably, retention area 13 is non-helical. Retention, area 13 preferably does not include sharp corners and/or edges, but bay include a coating, for example, a thermoplastic layer, forming a smooth surface. The layer on retention area 13 can be the same or a different material than the material on the remaining outer surface of support member 12. Moreover, an embodiment can include a retention area 13 having an air gap between optical fiber component 11 and the retention area coating. The shape of retention area 13 can include a radius on corners and/or edges for avoiding stress concentrations in support member 12. In the preferred embodiment, the corners and edges of retention area 13 have a radius of about zero to about 0.12 millimeters. Most preferably, the corners and edges of the retention area 13 have a radius of about 0.05 millimeters.

In the preferred embodiment, retention area 13 is sized to receive optical fiber component 11 and water blocking component 19. As illustrated in FIG. 2, a width 'W' of retention area 13 should be generally selected based upon the optical fiber component 11 that fiber optic cable 10 will employ. In general, preferred optical fibers have a range of diameters of about 250 microns to about 900 microns. The preferred embodiment includes four loose optical fibers each with a diameter of about 250 microns. An optical fiber with a diameter of about 250 microns has an acceptable range of diameters between about 240 microns to about 270 microns. By way of example, the width 'W' of the preferred embodiment may be calculated by taking the upper tolerance of diameter of the selected optical fiber and multiplying by the number of optical fibers, in this case about 270 microns times four, to yield a width 'W' of about 1,080 microns or about 1.08 millimeters.

Retention area 13 also includes a depth, 'D' as illustrated in FIG. 2. In an aspect of the present invention, depth 'D' of retention area 13 can be selected based upon optical fiber component 11 and water-blocking component 19 that the fiber optic cable 10 may employ. In addition, depth 'D' is preferably selected based on such considerations as crush ratings, temperature range, strain and/or stress loads. In preferred embodiments, optical fiber component 11 will be located at about or as close as possible to a neutral bending axis of the cable that is generally perpendicular to 'D' for avoiding undue stress on the optical fiber component. In other words, in the preferred embodiment, optical fiber component 11 is located generally on a transverse plane, generally perpendicular to depth 'D', that preferably experiences about zero stress when the fiber optic cable is stressed in the 'D' direction. Most preferably, 'D' is predetermined with a dimension that positions optical fiber component 11 at, or as close as possible, to the neutral bending axis thereby allowing cushioning zone 18 space between a bottom surface 14 of retention area 13 and optical fiber component 11. Alternatively, optical fiber components can be arranged in different configurations, for example, on a vertical axis, a diamond pattern or any other suitable configuration.

Figure 2A:
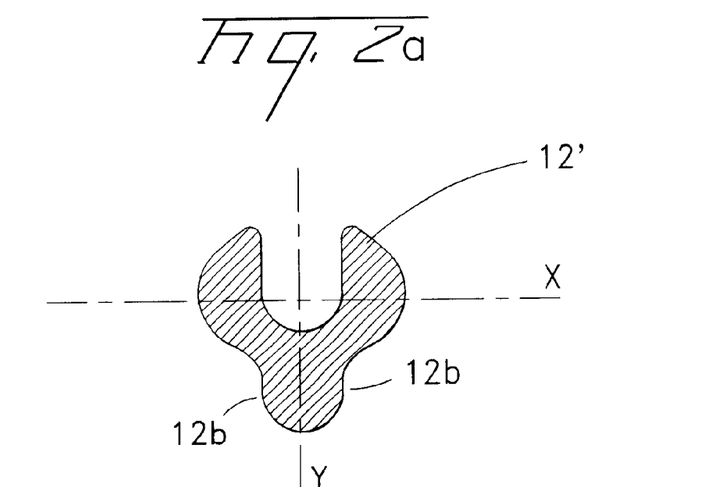
FIG. 2a is a cross sectional view of a support member in accordance with an embodiment of the present invention.
Figure 2B:
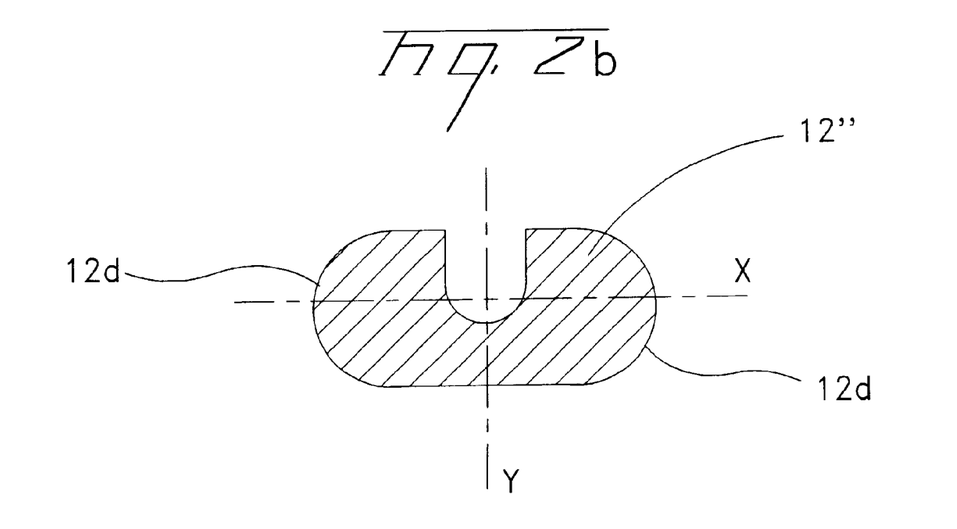
FIG. 2b is a cross sectional view of a support member in accordance with an embodiment of the present invention.
Figure 10:
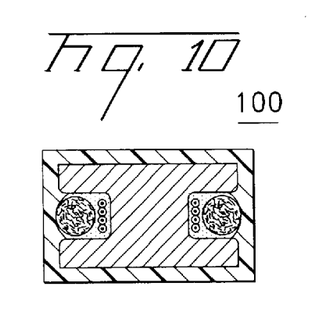
FIG. 10 is a cross-sectional view of a fiber optic cable in accordance an embodiment of the present invention.

Furthermore, as illustrated in FIG. 2a, a support member 12' can include one or more recesses 12b, which can advantageously control the location of the neutral axis of support member 12'. The support member geometry may aid in locating optical fiber component 11 at or about the neutral axis for reducing attenuation. Moreover, by taking into account the support member geometry the bending preference of cable 10 can be manipulated. A cable can generally have no bending preference if the bending moments of inertia along X and Y axes are about equal. For example, FIG. 10 illustrates a support member whose dimensions can be selected to have roughly equal bending moments of inertia along X and Y axes. A cable can have a slight preferential bend if one of the bending moments of inertia is about two to five times greater than the other orthogonal axis, such as illustrated in FIGS. 1 and 2. A cable can also have a high preferential bend if one of the bending moments of inertia is about five times or more than the other orthogonal axis. For example, FIG. 2b illustrates a high preferential bend support member 12' including a generally flat cross-section having arcuate ends 12d with a generally U-shaped retention area. This high preferential bend embodiment has advantages, for example, this support member is crush resistant. In other words, it is difficult to apply a crush load along the X-axis of support member 12' because the arcuate ends 12d tend to roll to the flat side distributing the crush load uniformly across the larger flat side.

Additionally, cable jacket 17 may include a retention area marking indicia (not illustrated) to aid in locating the optical fiber component 11. The preferred embodiment includes a cable jacket 17 marking indicia formed by a stripe, but may be a protrusion on the cable jacket 17, indentation, hot foil, dot, ink jet or laser printing or any other suitable indicia indicating the location of retention area 13. Indicia can also be an indentation, for example, as disclosed in U.S. Pat. No. 5,067,830, which is incorporated herein by reference.

Fiber optic cable 10 can have a range of outer diameters or major transverse measurements, but preferably the outer diameter or major transverse measurement is about 1 millimeter to about 10 millimeters or more. Additionally, fiber optic cable 10 may have different shapes, for example, circular, rectangular, square or elliptical.

Figure 3:
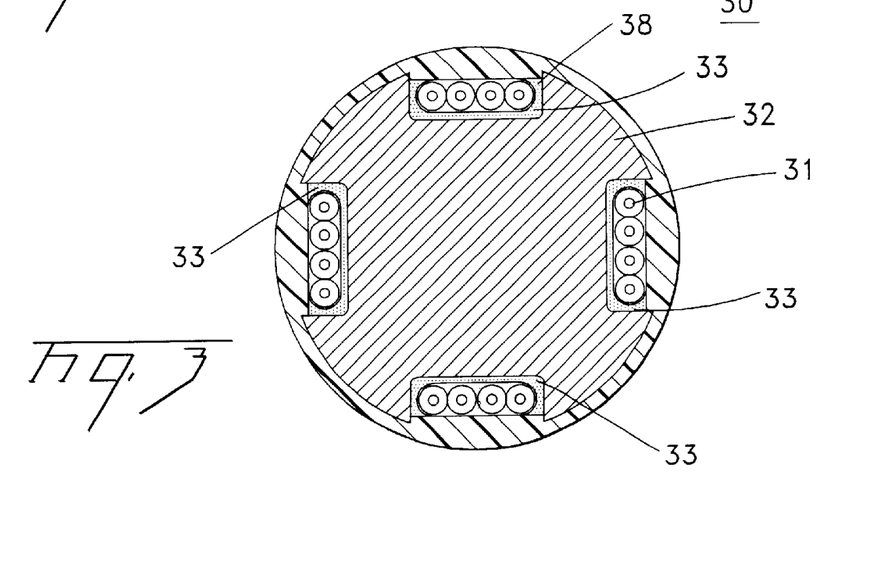
FIG. 3 is a cross-sectional view of a fiber optic cable in accordance with another embodiment of the present invention.

Fiber optic cable 10 is advantageous because, for example, it is suitable for both aerial and buried cable environments, it is reliable and low cost. However, fiber optic cable 10 can take other forms while still providing these same advantages. As shown in FIG. 3, for example, fiber optic cable 30 is another embodiment of the present invention. As described in conjunction with the embodiments of FIG. 1, fiber optic cable 30 includes at least one and, more preferably, a plurality of retention areas 33 in a support member 32. Various shapes and depths can define retention areas 33. Optical fiber components 31 can be disposed within each retention area 33, as illustrated, this embodiment includes an optical fiber ribbon and a cushioning zone 38 in each retention area. The embodiment in FIG. 3 may include an interfacial layer on an outer surface of support member 32, a cushioning zone, and/or a water-blocking component as described herein. Additionally, one or more of retention areas 33 can include a coaxial cable, a twisted pair or power wires.

Figure 4:
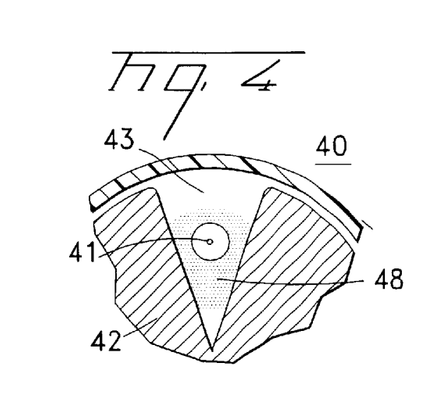
FIG. 4 is a partial cross-sectional view of a fiber optic cable in accordance with an embodiment of the present invention.

Illustrated in FIG. 4 is fiber optic cable 40 of another embodiment of the present invention. As described in conjunction with the embodiments of FIG. 1, fiber optic cable 40 includes a retention area 43 in a support member 42. Retention area. 43 is generally in the shape of a V and can be defined by various angles and depths. An optical fiber component 41 can be disposed within retention area 43. This embodiment includes a loose optical fiber with a cushioning zone 48 in retention area 43. The embodiment in FIG. 4 may include a plurality of retention areas, an interfacial layer on an outer surface of support member 42, a cushioning zone 48, and/or a water-blocking component as described herein.

Figure 5:
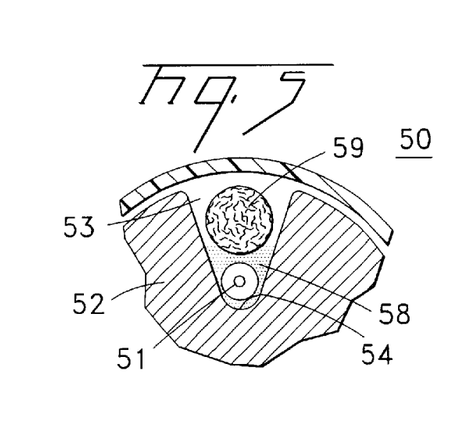
FIG. 5 is a partial cross-sectional view of a fiber optic cable in accordance with an embodiment of the present invention.

Illustrated in FIG. 5 is fiber optic cable 50 of another embodiment of the present invention. As described in conjunction with the embodiments of FIG. 1, fiber optic cable 50 includes a retention area 53 in a support member 52. Retention area 53 is generally in the shape of a V with a radius at a bottom surface. Most preferably, bottom surface 54 is selected to cradle the optical fiber component selected. Various angles and depths can define retention area 53. Optical fiber component 51 can be disposed within retention area 53. This embodiment includes a loose optical fiber with a cushioning zone 58 and a water-blocking component 59 in retention area 53. The embodiment in FIG. 5 may include a plurality of retention areas, an interfacial layer on an outer surface of support member 52, a cushioning zone 58, and/or a water-blocking component 59 as described herein.

Figure 6:
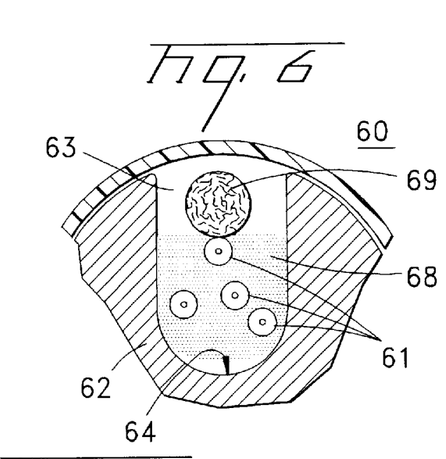
FIG. 6 is a partial cross-sectional view of a fiber optic cable in accordance with an embodiment of the present invention.

Illustrated in FIG. 6 is fiber optic cable 60 of another embodiment of the present invention. As described in conjunction with the embodiments of FIG. 1, fiber optic cable 60 includes a retention area 63 in a support member 62. Retention area 63 is generally in the shape of a U with a radius at a bottom surface 64. Various widths and depths can define retention area 63. Optical fiber component 61 can be disposed within retention area 63. This embodiment includes a plurality of loose optical fibers with a cushioning zone 68 and a water-blocking component 69 in retention area 63. The embodiment in FIG. 6 may include a plurality of retention areas, an interfacial layer on an outer surface of support member 62, a cushioning zone 68, and/or a water-blocking component 69 as described herein.

Figure 7:
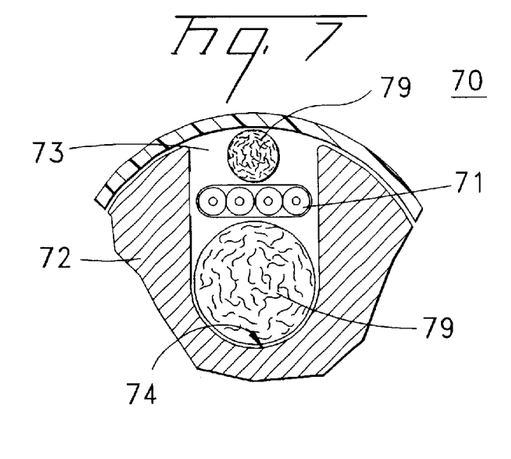
FIG. 7 is a partial cross-sectional view of a fiber optic cable in accordance with an embodiment of the present invention.

Illustrated in FIG. 7 is fiber optic cable 70 of another embodiment of the present invention. As described in conjunction with the embodiments of FIG. 1, fiber optic cable 70 includes a retention area 73 in a support member 72. Retention area 73 is generally in the shape of a U with a radius at a bottom surface 74. Various widths and depths can define retention area 73. The optical fiber component 71 can be disposed within the retention area 73. This embodiment includes an optical fiber ribbon with a plurality of water-blocking components 79 in the retention area 73 to decouple optical fiber component 71. The plurality of water-blocking components 79 are disposed adjacent the optical fiber component 71, more specifically, above and below the optical fiber component 71. The embodiment in FIG. 7 may include a plurality of retention areas, an interfacial layer on an outer surface of support member 72 and/or a cushioning zone 78 as described herein.

Figure 8:
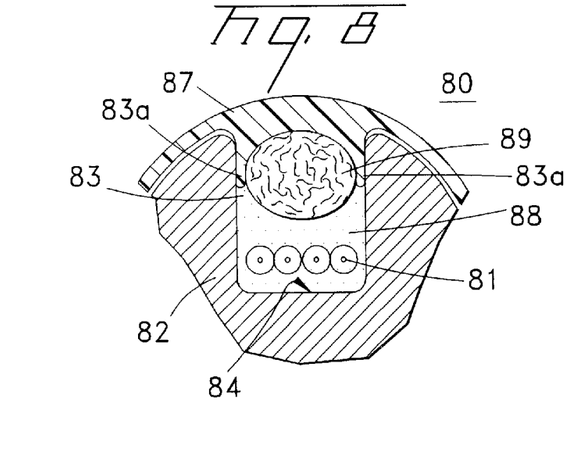
FIG. 8 is a partial cross-sectional view of a fiber optic cable in accordance with an embodiment of the present invention.

Illustrated in FIG. 8 is fiber optic cable 80 of another embodiment of the present invention. As described in conjunction with the embodiments of FIG. 1, fiber optic cable 80 includes a retention area 83 in a support member 82. Retention area 83 is generally in the shape of a U with a substantially flat bottom surface 84. Various widths and depths can define retention area 83. Optical fiber component 81 can be disposed within the retention area 83. This embodiment includes a plurality of loose optical fibers with a cushioning zone 88 and a water-blocking component 89 with a non-circular cross-section disposed within retention area 83. This embodiment includes a cable jacket 87 formed by a pressure fitted extrusion process. The pressure fitted extrusion process fills at least one interstice 83a in retention area 83. Filling the interstices 83a with the cable jacket material provides improved crush resistance/protection to fiber optic cable 80. The embodiment in FIG. 8 may include a plurality of retention areas, an interfacial layer on an outer surface of support member 82, a cushioning zone 88, and/or a water-blocking component 89 as described herein.

Figure 9:
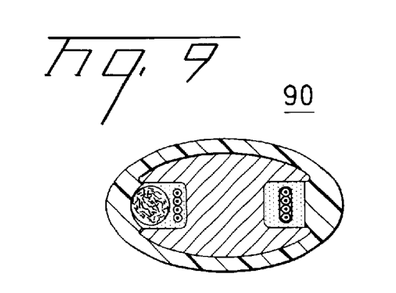
FIG. 9 is a cross-sectional view of a fiber optic cable in accordance with an embodiment of the present invention.
Figure 11:
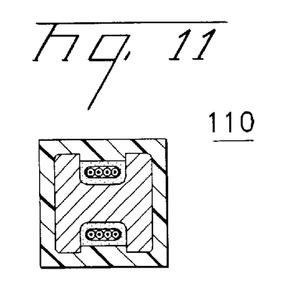
FIG. 11 is a cross-sectional view of a fiber optic cable in accordance with an embodiment of the present invention.

As illustrated in FIGS. 9, 10 and 11 the fiber optic cable of the present invention is depicted with non-circular cross-sections. The fiber optic cables of FIGS. 9, 10 and 11, optionally, may include a plurality of retention areas, an interfacial layer on the outer surface of support member, a cushioning zone, and/or a water-blocking component as described herein.

Figure 12:
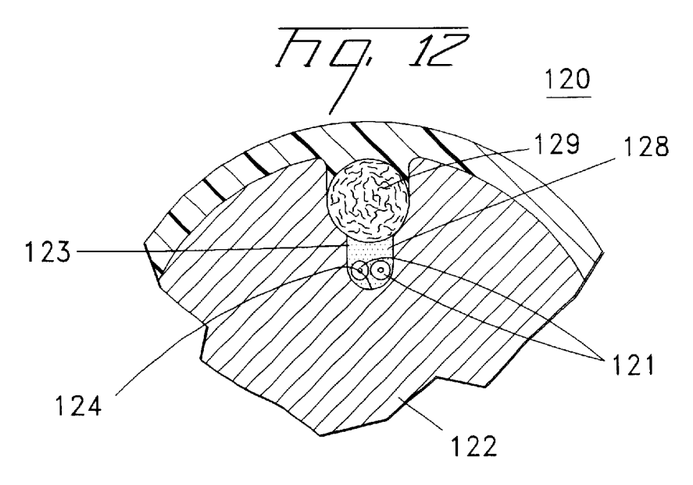
FIG. 12 is a partial cross-sectional view of a fiber optic cable in accordance with an embodiment of the present invention.

Illustrated in FIG. 12 is fiber optic cable 120 of another embodiment of the present invention. As described in conjunction with the embodiments of FIG. 1, fiber optic cable 120 includes a retention area 123 in a support member 122. The retention area 123 generally includes two distinct areas, more specifically, two stacked U-shaped areas with a radius at a bottom surface 124.

Both generally U-shaped areas can be defined by various widths and depths. Optical fiber component 121 can be disposed within the first generally U-shape of retention area 123, as illustrated, this embodiment includes loose optical fibers within a cushioning zone 128. Disposed in the second generally U-shaped area of retention area 123 is a water-blocking component 129. FIG. 13 illustrates a similar configuration; however, the depth of the second generally U-shaped area is selected so that a protrusion is formed above an uniform cross-section of the cable to function as an indicia to locate the retention area. The embodiments in FIGS. 12 and 13 may include a plurality of retention areas, an interfacial layer on an outer surface of support member, a cushioning zone, and/or a water-blocking component as described herein.

Figure 14:
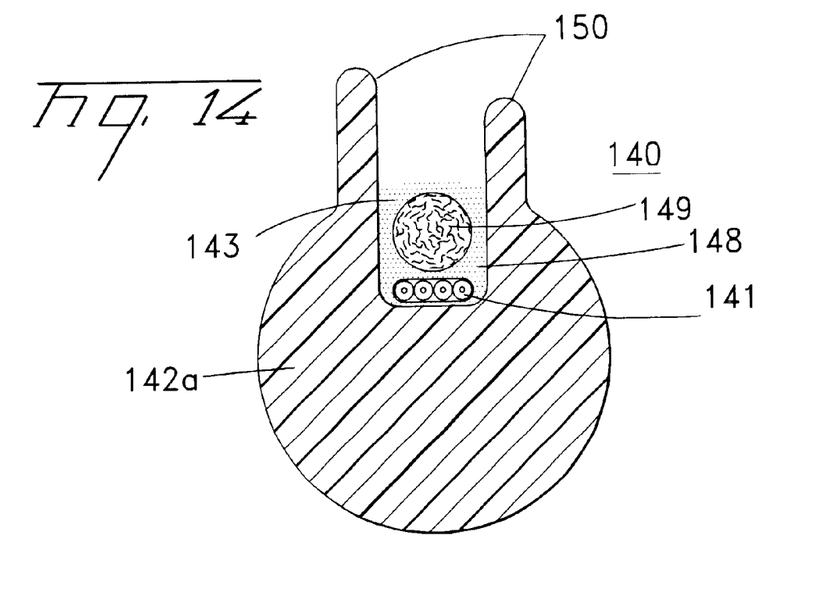
FIG. 14 is a cross-sectional view of a fiber optic cable in accordance with an embodiment of the present invention.
Figure 15:
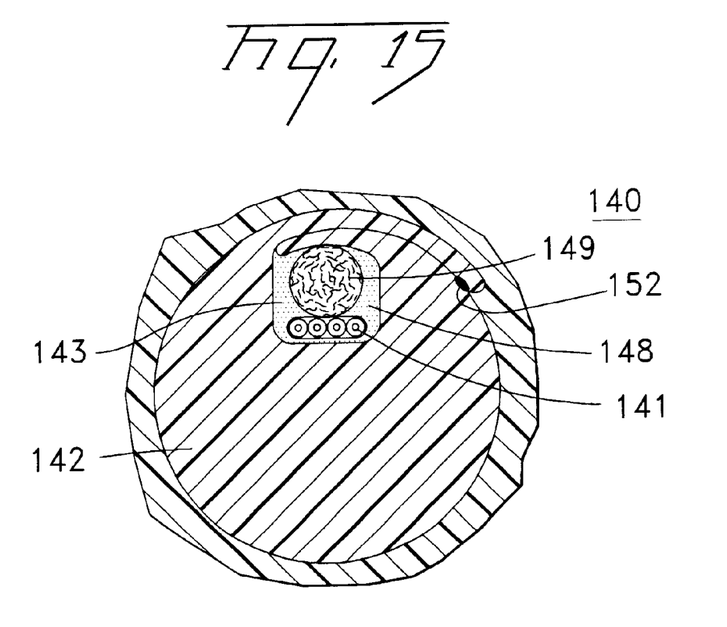
FIG. 15 is a cross-sectional view of a fiber optic cable embodiment, as illustrated in FIG. 14, after at least one manufacturing step.

FIG. 14 and 15 illustrate another embodiment of the present invention. As described in conjunction with the embodiments of FIG. 1, fiber optic cable 140 includes a retention area 143 in a support member 142. The support member 142 most preferably is made of a deformable metal, e.g. steel, but may be a dielectric or metallic material. Support member 142 includes a body 142a and at least one bendable tab 150 extending from the outer surface of the support member 142. Tab 150 is bendable relative to body 142a. Additionally, any embodiment of the present invention can include such a tab. The preferred embodiment includes two tabs of unequal length, but may include a single tab or two tabs of equal length. After insertion of the optical fiber component 141, and any other optional components, for example, a cushioning zone 148 and/or a water-blocking component 149, bendable tabs 150 can be folded to close the opening to retention area 143. FIG. 15 illustrates tabs 150 in the folded position Tab 150, most preferably, forms a smooth surface at the interface with body 142a to promote cable jacket adhesion. A sealing means 152 can be disposed adjacent a seam between tab 150 and support member 142 for preventing environmental effects from reaching retention area 143. The sealing means 152 may include an adhesive, cold fusion, laser welding, silicone, soldering or any other suitable material or process to substantially fix the tab and/or seal the seam. The embodiment of FIGS. 14 and 15 may include a plurality of retention areas, an interfacial layer on an outer surface of support member 142, a cushioning zone 148, a water-blocking component 149 and/or a cable jacket as described herein.

Many modifications and other embodiments of the present invention will become apparent to one skilled in the art, to which the present invention pertains, having the benefit of the teachings presented in the foregoing description and the associated drawings. For example, the support member could completely surround the optical fiber component, a plurality of support members and/or cables can be stranded together or a buffer tube, which houses the optical fiber components with or without a cushioning zone, can be disposed within the retention area. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. The invention has been described with reference to drop cable designs but the inventive concepts of the present invention are applicable to other cable types as well.

That which is claimed:

1. A fiber optic cable, comprising:
   a support member comprising a metallic material having at least one retention area that extends to an outer surface of the support member and is generally non-helically formed therein relative to an axis of the cable;
   at least one optical fiber component disposed within said at least one retention area; and
   a cable jacket generally surrounding said support member.

2. A fiber optic cable according to claim 1, said at least one optical fiber component being adjacent to a cushioning zone.

3. A fiber optic cable according to claim 2, said cushioning zone substantially surrounding the at least one optical fiber component.

4. A fiber optic cable according to claim 1, further comprising a water-blocking component at least partially disposed in said retention area.

5. A fiber optic cable according to claim 1, said at least one retention area being generally V-shaped.

6. A fiber optic cable according to claim 1, said at least one retention area being generally U-shaped.

7. A fiber optic cable according to claim 1, said at least one retention area being generally U-shaped with a generally flat bottom portion.

8. A fiber optic cable according to claim 1, a cross-sectional area of the cable being generally non-circular.

9. A fiber optic cable according to claim 1, said cable jacket including an indicia for locating the retention area.

10. A fiber optic cable according to claim 1, further comprising an interfacial layer at least partially disposed between an outer surface of said support member and said cable jacket.

11. A fiber optic cable according to claim 1, said at least one retention area including at least two generally distinct shaped areas.

12. A fiber optic cable according to claim 1, said cable having a non-preferential bend characteristic.

13. A fiber optic cable according to claim 1, said cable having a preferential bend characteristic.

14. A fiber optic cable, comprising:
    a metallic support member, said metallic support member having at least one retention area that extends to an outer surface of the support member and is disposed substantially parallel and in about a generally fixed position relative to a longitudinal axis of the cable;
    at least one optical fiber component disposed within said at least one retention area;
    a cushioning zone disposed in said at least one retention area and adjacent to said optical fiber component;
    at least one water-blocking component at least partially disposed in said retention area; and
    an interfacial layer at least partially disposed between the outer surface of said support member and a cable jacket generally surrounding said support member.

15. A fiber optic cable according to claim 14, said cushioning zone substantially surrounds the optical fiber component for decoupling said optical fiber component from said metallic support member.

16. A fiber optic cable according to claim 14, said at least one retention area being generally V-shaped.

17. A fiber optic cable according to claim 14, said at least one retention area being generally U-shaped.

18. fiber optic cable according to claim 14, said at least one retention area being generally U-shaped with a generally flat bottom portion.

19. A fiber optic cable according to claim 14, a cross-sectional area of the cable being generally non-circular.

20. A fiber optic cable according to claim 14, the cable comprising an indicia for locating the retention area.

21. A fiber optic cable according to claim 20, said indicia comprising a protrusion above a generally uniform cross-section of said cable.

22. A fiber optic cable according to claim 14, said at least one retention area including at least two generally distinct shaped areas.

23. A fiber optic cable according to claim 14, said at least one retention area comprising an interstice, said cable jacket at least partially filling said interstice.

24. A fiber optic cable according to claim 14, said cable having a non-preferential bend characteristic.

25. A fiber optic cable according to claim 14, said cable having a preferential bend characteristic.

26. A fiber optic cable comprising:
    a support member comprising a metallic material having at least one retention area generally longitudinally formed therein relative to an axis of the cable;
    at least one optical fiber component disposed within said at least one retention area; and
    the cable having a strain of about a 1.0% or less when applying about a 1,000 lb. tensile force.

27. A fiber optic cable according to claim 26, said cable having a strain of about 0.3% or less when applying about a 500 lb. tensile force.

28. A fiber optic cable according to claim 26, said cable having a strain about 0.3% or less when applying about a 300 lb. tensile force.

29. A fiber optic cable according to claim 26, said at least one optical fiber component being adjacent to a cushioning zone.

30. A fiber optic cable according to claim 29, said cushioning zone substantially surrounding said at least one optical fiber component.

31. A fiber optic cable according to claim 26, further comprising a water-blocking component at least partially disposed in said retention area.

32. A fiber optic cable according to claim 26, further comprising a cable jacket generally surrounding said support member.

33. A fiber optic cable according to claim 32, said cable jacket comprising an indicia.

34. A fiber optic cable according to claim 32, further comprising an interfacial layer at least partially disposed between an outer surface of said support member and said cable jacket.

35. A fiber optic cable according to claim 26, said cable having a non-preferential bend characteristic.

36. A fiber optic cable according to claim 26, said cable having a preferential bend characteristic.

* * * * *